US011263993B2

(12) United States Patent
Hundal et al.

(10) Patent No.: US 11,263,993 B2
(45) Date of Patent: *Mar. 1, 2022

(54) DEVICES AND METHODS FOR BRIDGING VIDEO INFORMATION OVER AN EXTENSION MEDIUM

(71) Applicant: Icron Technologies Corporation, Burnaby (CA)

(72) Inventors: Sukhdeep Singh Hundal, Surrey (CA); Travis James Danniels, Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,185

(22) Filed: Oct. 23, 2020

(65) Prior Publication Data
US 2021/0043159 A1    Feb. 11, 2021

Related U.S. Application Data

(63) Continuation of application No. 16/133,569, filed on Sep. 17, 2018, now Pat. No. 10,818,263, which is a
(Continued)

(51) Int. Cl.
*G09G 5/00* (2006.01)
*G06F 3/14* (2006.01)
(Continued)

(52) U.S. Cl.
CPC .............. *G09G 5/006* (2013.01); *G06F 3/14* (2013.01); *G06F 13/385* (2013.01);
(Continued)

(58) Field of Classification Search
None
See application file for complete search history.

(56) References Cited

U.S. PATENT DOCUMENTS 8,549,197 B2    10/2013  Hall et al.
2008/0240152 A1  10/2008  Quinn et al.
(Continued)

OTHER PUBLICATIONS

Choate, "VES DisplayPort Technology and Compliance Program Update", Dec. 10, 2014 (Year: 2014).*
(Continued)

*Primary Examiner* — Yingchun He
(74) *Attorney, Agent, or Firm* — Christensen O'Connor Johnson Kindness PLLC

(57) ABSTRACT

In some embodiments, an upstream facing port device (UFP device) is connected to a DisplayPort source device via a connection that complies with the DisplayPort specifications. A downstream facing port device (DFP device) is connected to a DisplayPort sink device via a connection that complies with the DisplayPort specifications. The UFP device and the DFP device are connected via an extension medium to allow the DisplayPort source device to provide video and/or audio for presentation by the DisplayPort sink device. In some embodiments, the UFP device and/or the DFP device may be configured to provide video extracted from the DisplayPort communication to an external video processing device for processing before and/or after transmission over the extension medium.

9 Claims, 8 Drawing Sheets

Related U.S. Application Data continuation of application No. 15/351,122, filed on Nov. 14, 2016, now Pat. No. 10,078,997.

(51) Int. Cl.
  *G06F 13/38* (2006.01)
  *G06F 13/42* (2006.01)

(52) U.S. Cl.
  CPC .. *G06F 13/4282* (2013.01); *G06F 2213/4004* (2013.01); *G09G 2370/04* (2013.01); *G09G 2370/10* (2013.01); *G09G 2370/22* (2013.01)

(56) References Cited

U.S. PATENT DOCUMENTS

| | | |
|---|---|---|
| 2009/0279473 A1 | 11/2009 | Lu et al. |
| 2011/0150055 A1 | 6/2011 | Qu et al. |
| 2011/0243035 A1 | 10/2011 | Hall et al. |
| 2012/0173769 A1 | 7/2012 | Loo |
| 2014/0273833 A1 | 9/2014 | McCormack et al. |
| 2016/0127671 A1 | 5/2016 | Hundal et al. |

OTHER PUBLICATIONS

International Search Report and Written Opinion dated Feb. 8, 2018, issued in corresponding International Application No. PCT/CA2017/051357, filed Nov. 14, 2017, 14 pages.

"VESA DisplayPort Standard," Version 1, Revision 1a, Jan. 11, 2008, Video Electronics Standards Association, Milpitas, Calif., 238 pages.

Choate, "VES DisplayPort Technology and Compliance Program Update," Dec. 10, 2014.

USB Type-CTIM Crosspoint Switch (ANX7428 Product Brief, Aug. 2016.

* cited by examiner

DEVICES AND METHODS FOR BRIDGING VIDEO INFORMATION OVER AN EXTENSION MEDIUM

CROSS-REFERENCE TO RELATED APPLICATION

This application is a continuation of application Ser. No. 16/133,569, filed Sep. 17, 2018, now U.S. Pat. No. 10,818,263, issued Oct. 27, 2020; which is a continuation of application Ser. No. 15/351,122, filed Nov. 14, 2016, now U.S. Pat. No. 10,078,997, issued Sep. 18, 2018, the entire disclosures of which are hereby incorporated by reference herein for all purposes.

BACKGROUND

DisplayPort communication is described in detail at least in "VESA DisplayPort Standard, Version 1.4," released on Mar. 1, 2016, by VESA. This document, the content of which is known to one of ordinary skill in the art, is hereby incorporated by reference herein in its entirety, along with any earlier versions or related documents mentioned therein (collectively hereinafter "the DisplayPort specification"), for all purposes. The DisplayPort specification describes physical and logical techniques for communication between a DisplayPort source device which generates video (and, in some embodiments, audio) and a DisplayPort sink device which presents the video (and, in some embodiments, audio). The DisplayPort specification also describes topologies wherein one or more branch devices (which are similar to repeaters, splitters, or hubs) are present between the DisplayPort source device and the DisplayPort sink device.

The DisplayPort specification includes some limits on the length of a cable connecting the DisplayPort source device and the DisplayPort sink device, and also includes other specific requirements for the physical construction of the cable. For example, full bandwidth transmission over a passive cable is limited to a cable length of three meters. Further, the DisplayPort specification describes direct communication between the DisplayPort source device and the DisplayPort sink device, but does not allow any manipulation of the video or audio content between the DisplayPort source device and the DisplayPort sink device.

What is desired are devices and techniques that allow DisplayPort source and sink devices that otherwise comply with the DisplayPort specifications to communicate over an extension medium despite the transmission distance limits and media requirements of the DisplayPort specifications. It is also desired to provide devices and techniques that allow manipulation of the video or audio content between the DisplayPort source device and the DisplayPort sink device in a manner that is transparent to the DisplayPort source device and the DisplayPort sink device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an upstream facing port device (UFP device) is provided. The UFP device comprises a DisplayPort interface configured to be coupled to a DisplayPort source device; an extension interface configured to be coupled to an extension medium; an upstream video engine configured to receive DisplayPort information from the DisplayPort interface; and an upstream AUX engine. The upstream AUX engine is configured to disable a hot plug detect (HPD) signal from being transmitted by the DisplayPort interface to the DisplayPort source device; receive, via the extension interface, a notification from a downstream facing port device indicating a link training result between the downstream facing port device and a DisplayPort sink device; and, in response to receiving the notification: enable the HPD signal transmission by the DisplayPort interface to the DisplayPort source device; and cause the upstream video engine to conduct link training with the DisplayPort source device based on the link training result from the downstream facing port device.

In some embodiments, a downstream facing port device (DFP device) is provided. The DFP device comprises a DisplayPort interface configured to be coupled to a DisplayPort sink device; an extension interface configured to be coupled to an extension medium; a downstream video engine configured to provide DisplayPort information to the DisplayPort sink device; and a downstream AUX engine. The downstream AUX engine is configured to cause the downstream video engine to conduct link training with the DisplayPort sink device; receive information regarding link training results from the downstream video processing engine; cause the downstream video engine to transmit placeholder video signals to the DisplayPort sink device; transmit the information regarding the link training results to an upstream facing port device via the extension interface; and, in response to receiving incoming video signals from the upstream facing port device via the extension interface, cause the downstream video engine to transmit video from the incoming video signals to the DisplayPort sink device.

In some embodiments, a method for establishing DisplayPort communication between a DisplayPort source device and a DisplayPort sink device over an extension medium via an upstream facing port device (UFP device) and a downstream facing port device (DFP device) is provided. The DFP device conducts link training between the DFP device and the DisplayPort sink device. The DFP device transmits a link training result to the UFP device. In response to receiving the link training result, the UFP device conducts link training between the UFP device and the DisplayPort source device based on the link training result.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In some embodiments of the present disclosure, an upstream facing port device (UFP device) is connected to a DisplayPort source device via a connection that complies with the DisplayPort specifications. A downstream facing port device (DFP device) is connected to a DisplayPort sink device via a connection that complies with the DisplayPort specifications. The UFP device and the DFP device are connected via an extension medium to allow the DisplayPort source device to provide video and/or audio for presentation by the DisplayPort sink device. In some embodiments, the UFP device and/or the DFP device may be configured to provide video extracted from the DisplayPort communication to an external video processing device for processing before or after transmission over the extension medium. In some embodiments, the connection between the UFP device and the DisplayPort source device, and/or the connection between the DFP device and the DisplayPort sink device, may pass through one or more DisplayPort branch devices.

Figure 1A:
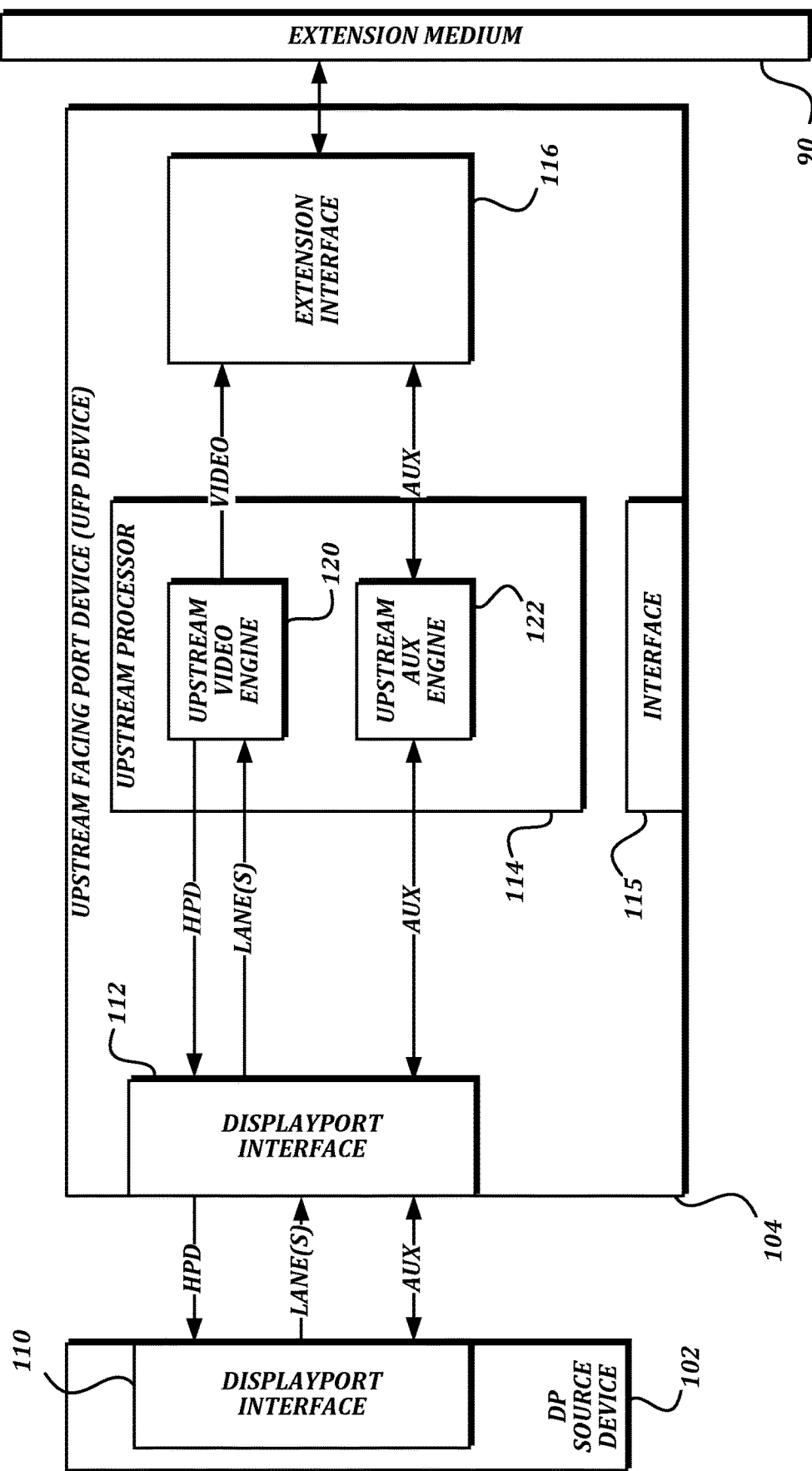
FIGS. 1A and 1B are block diagrams that respectively illustrate exemplary embodiments of an upstream facing port device (UFP device) and a downstream facing port device (DFP device) in a first configuration according to various aspects of the present disclosure.
Figure 1B:
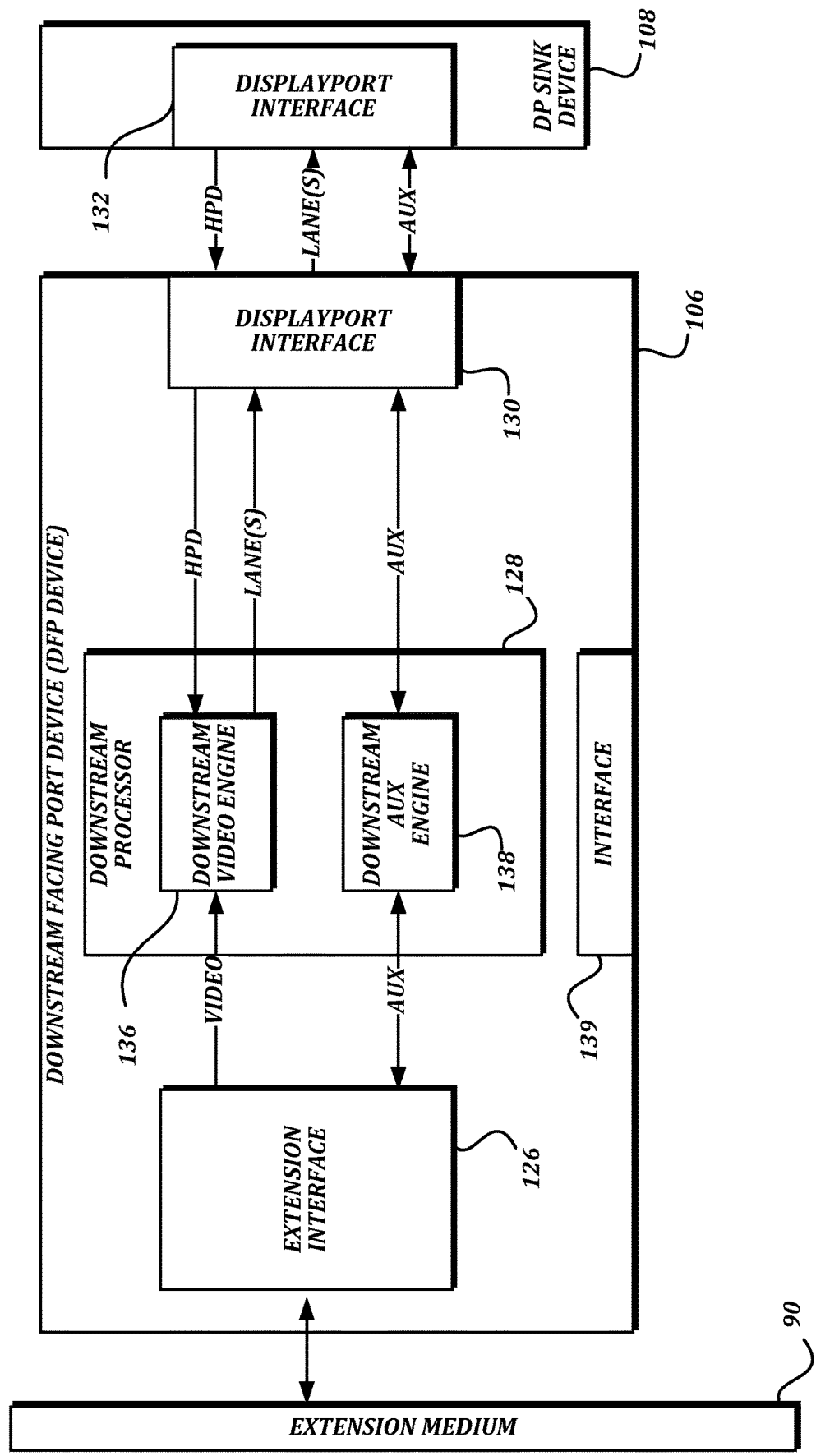

FIGS. 1A and 1B are block diagrams that respectively illustrate exemplary embodiments of an upstream facing port device (UFP device) and a downstream facing port device (DFP device) in a first configuration according to various aspects of the present disclosure. In FIG. 1A, a DisplayPort source device 102, an upstream facing port device (UFP device) 104, and an extension medium 90 are illustrated. The DisplayPort source device 102 may be any type of device having a DisplayPort receptacle and capable of transmitting DisplayPort information, including but not limited to a desktop computing device, a laptop computing device, a tablet computing device, a rack-mount computing device, an external graphics card, a video processing system, and/or the like. The DisplayPort source device 102 includes a DisplayPort interface 110, which is communicatively coupled to a DisplayPort interface 112 of the UFP device 104. The connection between the DisplayPort source device 102 and the UFP device 104 via the DisplayPort interfaces 110, 112 includes standard DisplayPort receptacles, a DisplayPort cable, and the like, as described in the DisplayPort specifications and as known to one of ordinary skill in the art. In some embodiments, the DisplayPort interfaces 110, 112 may include one or more of a DisplayPort connector, a USB Type-C connector, and/or a DockPort connector.

The UFP device 104 includes an upstream processor 114. In some embodiments, the upstream processor 114 may be implemented using a field-programmable gate array (FPGA), an application-specific integrated circuit (ASIC), a microcontroller, and/or any other suitable type of computing device or integrated circuit. The upstream processor 114 is configured to provide an upstream video engine 120 and an upstream AUX engine 122.

In general, the word "engine," as used herein, refers to logic embodied in hardware, or software instructions which can be written in a programming language, such as C, C++, COBOL, JAVA™, PHP, Perl, HTML, CSS, JavaScript, VBScript, ASPX, Microsoft .NET™, and/or the like. An engine embodied in hardware may be designed using a hardware description language (HDL). A software engine may be compiled into executable programs or written in interpreted programming languages. Engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or application. The engines may also be implemented using a floating point gate array (FPGA), an application-specific integrated circuit (ASIC), a microcontroller, or any other suitable type of integrated circuit computing device.

In some embodiments, the upstream video engine 120 is configured to receive one or more DisplayPort lanes from the DisplayPort interface 112. The upstream video engine 120 is configured to recover the video and/or audio signals from the DisplayPort lanes, and to provide the video and/or audio signals to the extension interface 116. In some embodiments, the upstream video engine 120 may configurably perform further processing on the video and/or audio before providing it to the extension interface 116, including but not limited to changing a bit rate of the information, encrypting the information, upsampling or downsampling the information, and/or any other type of processing. In some embodiments, the upstream video engine 120 is also configured to selectively provide a hot plug detect (HPD) signal to the DisplayPort source device 102 via the DisplayPort interface 112. The upstream video engine 120 may selectively provide the HPD signal based on instructions received from the upstream AUX engine 122 or other components of the UFP device 104. Further illustration and description of an exemplary embodiment of an upstream video engine 120 is provided in FIG. 3 and the accompanying text.

In some embodiments, the upstream AUX engine 122 is configured to manage AUX channel communication with the DisplayPort source device and to control the selective presentation of the HPD signal by the upstream video engine 120. One of the technical challenges of extending DisplayPort communication across the extension medium 90 is that the UFP device 104 may be unaware of the presence, configuration, or capabilities of the DFP device 106 or the DisplayPort sink device 108 upon connection of the DisplayPort source device 102 to the DisplayPort interface 112. Accordingly, the upstream AUX engine 122 manipulates the information communicated via the AUX channel and the HPD signal in order to overcome these challenges. The upstream AUX engine 122 and the upstream video engine 120 may also be configured to conduct link training with the DisplayPort source device 102. Further details regarding some example techniques used by the upstream AUX engine 122 and the upstream video engine 120 to provide this functionality are provided below.

In some embodiments, the upstream video engine 120 and the upstream AUX engine 122 communicate video/audio and AUX information with the DFP device 106 over the extension medium 90 via an extension interface 116. In some embodiments, the extension medium 90 and communication thereon may include any suitable networking technology, such as Ethernet, Bluetooth, WiFi, WiMax, the Internet, serial communication, and/or the like, and any suitable communication medium, such as via physical cables, via wireless spectrum, via fiber-optic cable, and/or the like. In some embodiments, the UFP device 104 and the DFP device 106 may happen to be closer to each other than the maximum distances specified in the DisplayPort specifications, but may nevertheless communicate via the extension medium 90. In some embodiments, the extension interface 116 is configured to provide a physical layer connection and logic that allows communication over the extension medium 90. Further illustration and description of an exemplary embodiment of an extension interface 116 is provided in FIG. 5 and the accompanying text.

In some embodiments, the UFP device 104 also includes an external interface 115 capable of providing video, audio, and/or AUX communication to an external device. In the embodiment illustrated in FIG. 1A, the external interface 115 is not being used.

In FIG. 1B, a DisplayPort sink device 108, a downstream facing port device (DFP device), 106, and the extension medium 90 are illustrated. The DisplayPort sink device 108 may be any type of device capable of acting as a DisplayPort sink as described in the DisplayPort specification. Some non-limiting examples of DisplayPort sink devices 108 include liquid crystal display (LCD) monitors, projectors, large-format screens, video processing systems, and/or the like. The DisplayPort sink device 108 includes a DisplayPort interface 132, which is communicatively coupled to a DisplayPort interface 130 of the DFP device 106 using a cable or other connector. As with the connection between the DisplayPort source device 102 and the UFP device 104, the cable and interfaces 130, 132 include standard DisplayPort receptacles, plugs, conductors, and the like, as described in the DisplayPort specifications and as known to one of ordinary skill in the art.

In some embodiments, the DFP device 106 includes a downstream processor 128. As with the upstream processor 114, the downstream processor 128 and/or its components may be implemented using an FPGA, an ASIC, a microcontroller, and/or any other suitable type of computing device or integrated circuit. The downstream processor 128 provides a downstream video engine 136 and a downstream AUX engine 138.

In some embodiments, the downstream video engine 136 is configured to receive video and/or audio signals from the extension interface 126, and to generate one or more DisplayPort lanes based on the video and/or audio signals. The downstream video engine 136 is configured to provide the DisplayPort lanes to the DisplayPort sink device 108 via the DisplayPort interface 130. The downstream video engine 136 may also be configured to receive and detect the HPD signal transmitted by the DisplayPort sink device 108 via the DisplayPort interface 130. Further illustration and description of an exemplary embodiment of a downstream video engine 136 is provided in FIG. 4 and the accompanying text.

In some embodiments, the downstream AUX engine 138 is configured to manage AUX channel communication with the DisplayPort sink device 108, and may be configured to negotiate capabilities with the upstream AUX engine 122 such that the upstream AUX engine 122 can report capabilities to the DisplayPort host device 102 that match the capabilities of the DisplayPort sink device 108 (or other capabilities as selectively configured). The downstream AUX engine 138 and the downstream video engine 136 may also be configured to conduct link training with the DisplayPort sink device 108. Further details regarding some example techniques used by the downstream AUX engine 138 and the downstream video engine 136 to provide this functionality are provided below.

In some embodiments, the downstream video engine 136 and the downstream AUX engine 138 communicate with the upstream video engine 120 and the upstream AUX engine 122 via the extension medium 90 using the extension interface 126. The extension medium was described above, and the extension interface 126 is also similar to the extension interface 116 illustrated in FIG. 1A (though operating in reverse). Further illustration and description of an exemplary embodiment of an extension interface 126 is provided in FIG. 5 and the accompanying text.

Figure 2A:
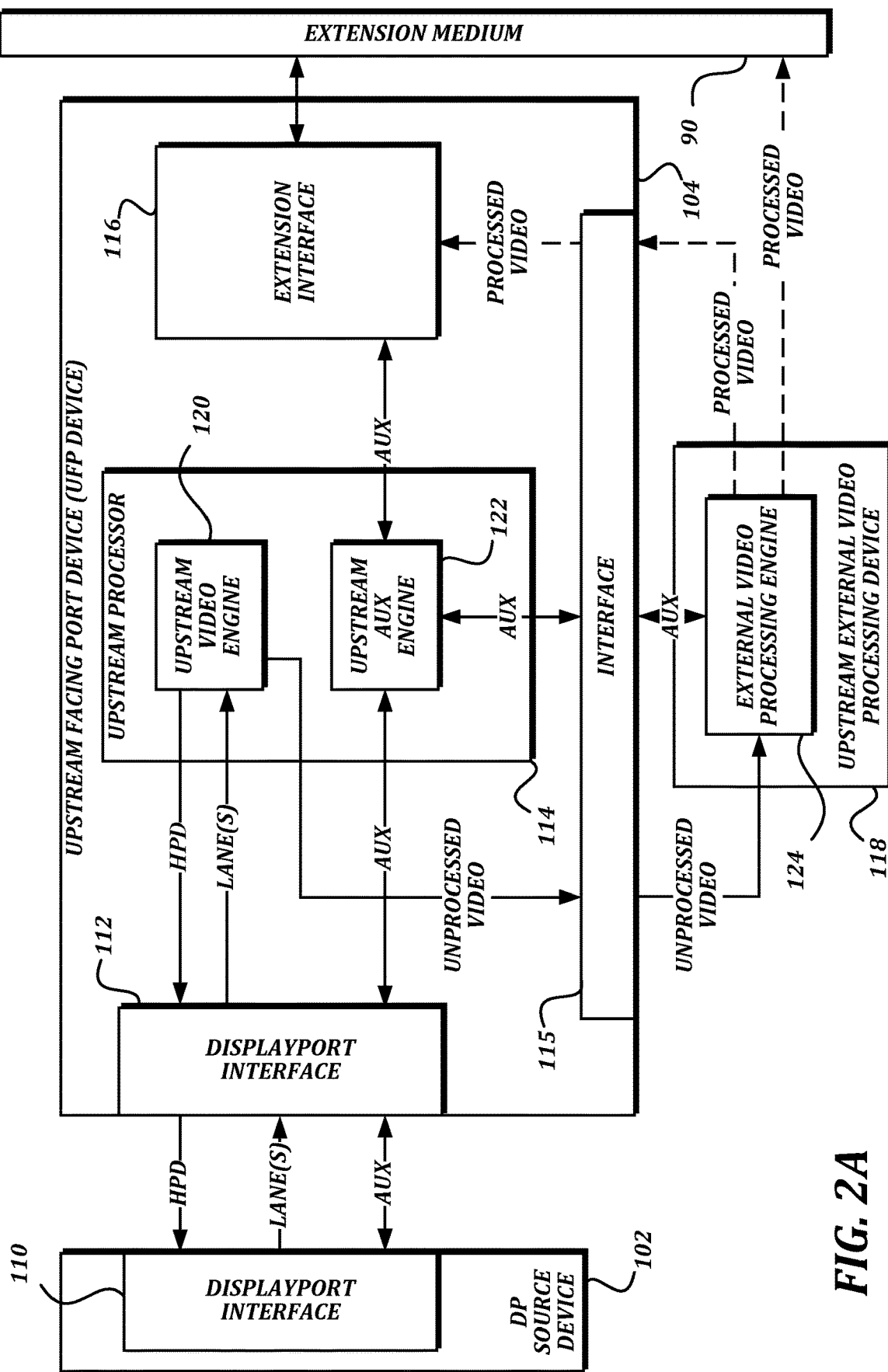
FIGS. 2A and 2B are block diagrams that respectively illustrate exemplary embodiments of a UFP device and a DFP device in a second configuration according to various aspects of the present disclosure.
Figure 2B:
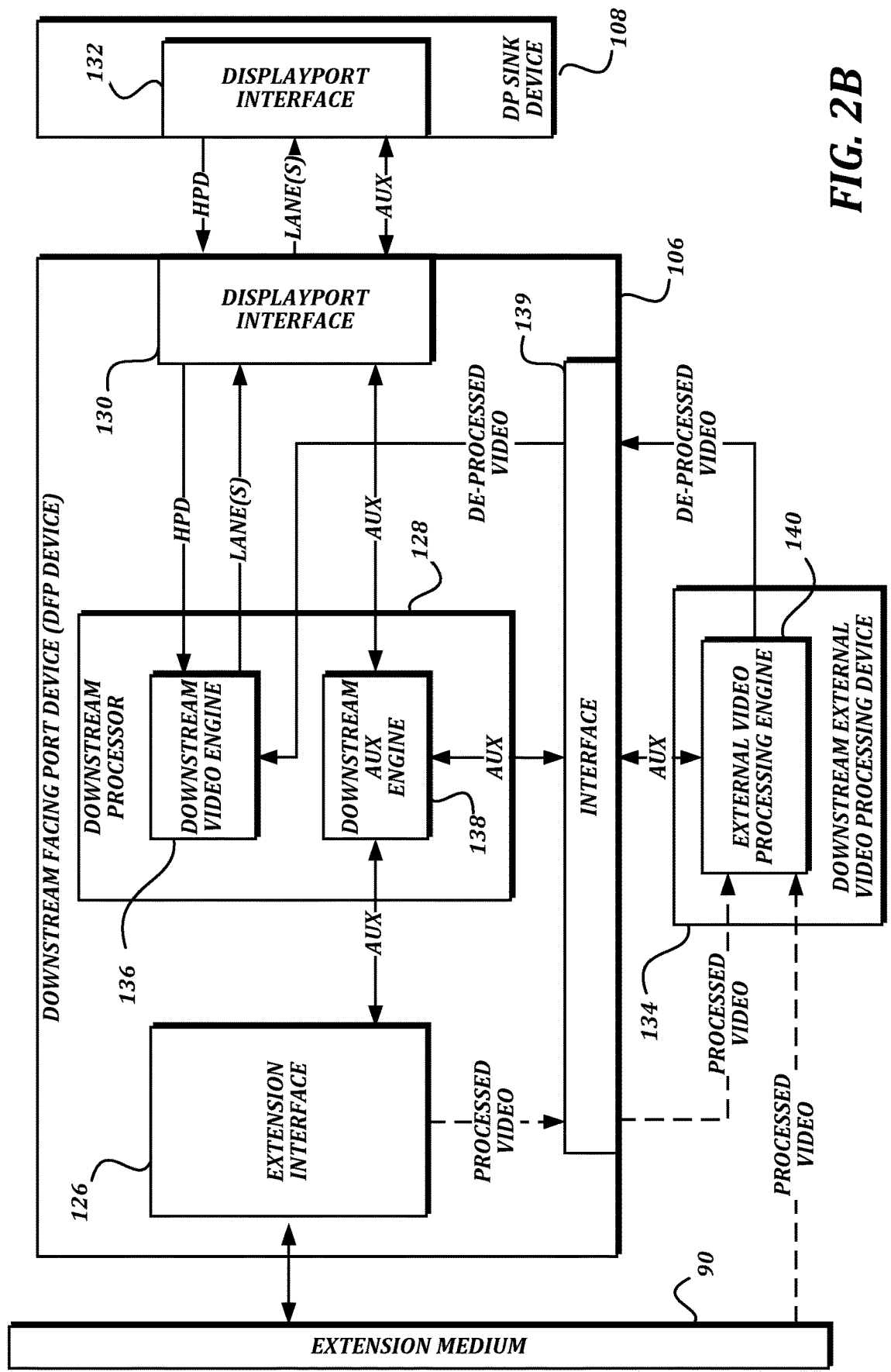

FIGS. 2A and 2B are block diagrams that respectively illustrate exemplary embodiments of a UFP device and a DFP device in a second configuration according to various aspects of the present disclosure. In FIG. 2A, a UFP device 104, a DisplayPort source device 102, and an extension medium 90 are illustrated. The UFP device 104, the DisplayPort source device 102, and the extension medium 90 are similar to those discussed in FIG. 1A, and so a full description of all components is not provided for the sake of brevity.

One way in which the UFP device 104 illustrated in FIG. 2A is different from the UFP device 104 illustrated in FIG. 1A is that it is connected via the interface 115 to an upstream external video processing device 118. The interface 115 may be connected to a complementary interface on the upstream external video processing device 118, which is not illustrated for the sake of clarity. The interface 115 may be any suitable interface for transferring video and/or audio data between the UFP device 104 and the upstream external video processing device 118, including but not limited to Ethernet, a 10-gigabit media independent interface, a 10-gigabit attachment unit interface (XAUI), a reduced XAUI (RXAUI) interface, a high speed SERDES, and/or the like.

The upstream external video processing device 118 may be a purpose-built graphics processing device, a graphics card, and/or any other suitable device configured to receive video signals, process them into a different format, and output the processed video. Some non-limiting examples of suitable devices include compression devices, overlay devices, On-screen Display (OSD) devices, and scaler devices. In some embodiments, the upstream external video processing device 118 includes an external video processing engine 124 that performs the video processing. The upstream external video processing device 118 is referred to as "upstream" for the clarity of the description, because it is attached to the UFP device 104. The external video processing engine 124 is referred to as "external" because it is external from the UFP device 104, the DFP device 106, the DisplayPort source device 102, and the DisplayPort sink device 108. The ability to seamlessly provide the video and/or audio that was transmitted from the DisplayPort source device 102 for external processing allows different interchangeable video processing devices 118 to be used with a given UFP device 104, such as if different processing capabilities are desired. It also allows the UFP device 104 to provide extension capabilities to a non-extension-enabled video processing device 118.

In the embodiment illustrated in FIG. 2A, the upstream video engine 120 receives one or more lanes of DisplayPort data, and extracts the original video and/or audio information from the lanes. Instead of transmitting the video and/or audio to the extension interface 116, the upstream video engine 120 provides the video to the upstream external video processing device 118 via the interface 115. The upstream external video processing device 118 then processes the unprocessed video to create processed video. In some embodiments, digital video may be provided to the upstream external video processing device 118 in any suitable format.

In some embodiments, the upstream external video processing device 118 may provide the processed video directly to the extension medium 90. For example, the upstream external video processing device 118 may itself have an Ethernet interface, and so may be capable of transmitting the processed video directly to the DFP device 106 or the downstream external video processing device 134 via the extension medium 90. In some embodiments, the upstream external video processing device 118 may provide the processed video back to the interface 115, so that the processed video may be transmitted to the DFP device 106 or the downstream external video processing device 134 via the extension interface 116.

In some embodiments, the upstream external video processing device 118 may also contribute to the AUX communication via the interface 115. In such embodiments, the upstream external video processing device 118 may communicate with the upstream AUX engine 122 to provide additional capabilities to the DisplayPort source device 102 that can be supported with the assistance of the upstream external video processing device 118, or to limit the capabilities advertised to the DisplayPort source device 102. In some embodiments, the upstream external video processing device 118 may eavesdrop on the AUX channel communication between the other devices in order to properly configure itself.

In FIG. 2B, a DFP device 106, a DisplayPort sink device 108, and an extension medium 90 are illustrated. Again, the DFP device 106, the DisplayPort sink device 108, and extension medium 90 are similar to those illustrated in FIG. 1B, and so all of the components are not described again in detail to avoid repetition. The DFP device 106 is connected via an interface 139 to a downstream external video processing device 134. The interface 139 is similar to the interface 115 illustrated and discussed above with respect to the UFP device 104. The downstream external video processing device 134 could be any suitable type of device for processing video and/or audio information, including but not limited to the types of devices suitable for use as the upstream external video processing device 118. The downstream external video processing device 134 includes an external video processing engine 140 that performs the video processing. The downstream external video processing device 134 is referred to as "downstream" because it is attached to the DFP device 106 as opposed to the UFP device 104, and "external" because it is separate from the DisplayPort source device 102, the UFP device 104, the DFP device 106, and the DisplayPort sink device 108.

As illustrated in FIG. 2B, the downstream external video processing device 134 receives processed video. In some embodiments, the downstream external video processing device 134 receives the processed video directly from the extension medium 90. In some embodiments, the downstream external video processing device 134 receives the processed video from the DFP device 106 via the interface 139. Once received, the external video processing engine 140 re-processes the processed video to create de-processed video, which it then outputs to the DFP device 106 via the interface 139. The downstream video engine 136 receives the de-processed video, and creates one or more DisplayPort lanes that include the de-processed video. In some embodiments, digital video may be provided to and from the downstream external video processing device 134 in any suitable format. Similar to the discussion above, the downstream external video processing device 134 can contribute to the AUX channel communication via the interface to either provide additional capabilities, limit the advertised capabilities, or configure itself based on the result of link training between the DFP device and the DisplayPort sink device 108.

In some embodiments (such as the embodiments illustrated in FIGS. 2A-2B), the upstream external video processing device 118 and the downstream external video processing device 134 may be paired devices that perform complimentary processing. As described, the upstream external video processing device 118 may process the video for more efficient transmission over the extension medium 90 (such as reducing a bit rate via a lossless compression algorithm such as H.264 lossless compression and/or the like), and the downstream external video processing device 134 may generate de-processed video by decompressing the received processed video. In some embodiments, the processing performed by the upstream external video processing device 118 to create processed video may include encrypting the video using any suitable algorithm, including but not limited to DES, AES, and RSA, and the processing performed by the downstream external video processing device 134 may include decrypting the processed video to create the de-processed video. In some embodiments, the upstream external video processing device 118 and the downstream external video processing device 134 may collaborate to support HDCP encryption, decryption, and/or verification. In some embodiments, processing may include any type of two-dimensional or three-dimensional video processing, including but not limited to overlay, underlay, scaling, reformatting, and compression. In some embodiments, the upstream external video processing device 118 and the downstream external video processing device 134 may perform different types of processing. For example, the upstream external video processing device 118 may change a frame rate of the video information, and the downstream external video processing device 134 may zoom a region of interest in the video information. In some embodiments, only one of the upstream external video processing device 118 and the downstream external video processing device 134 may be present.

Figure 3:
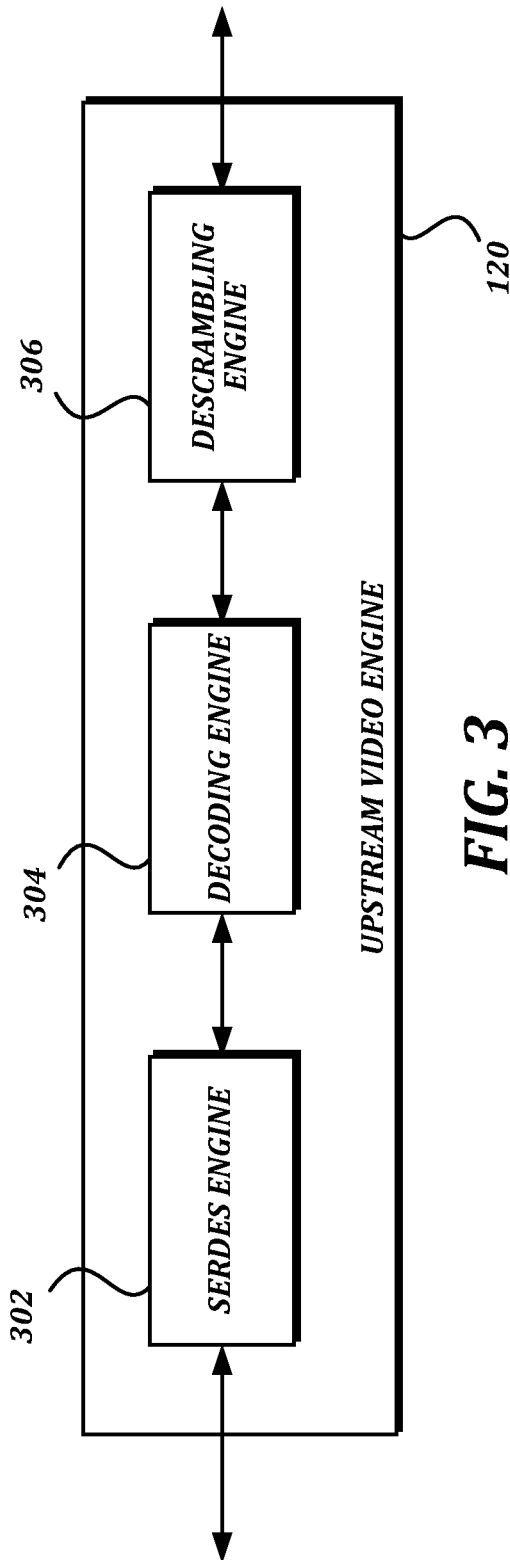
FIG. 3 is a block diagram that illustrates an exemplary embodiment of an upstream video engine according to various aspects of the present disclosure.

FIG. 3 is a block diagram that illustrates an exemplary embodiment of an upstream video engine according to various aspects of the present disclosure. As illustrated, the upstream video engine 120 includes a SERDES engine 302, a decoding engine 304, and a descrambling engine 306. The SERDES engine 302, or serializer/deserializer engine, is configured to deserialize parallel data streams that have been received via the DisplayPort interface 112 in a serial format. The received data streams may include one or more scrambled and encoded video data streams. The received signals may also include AUX channel data, audio data, and/or other types of data.

The decoding engine 304 is configured to decode the encoded signals received from the SERDES engine 302. The decoding algorithm to be used may be specified via AUX channel communication, such that the decoding engine 304 can be configured to use a decoding technique that matches the incoming data. Some non-limiting examples of encoding formats include 8b/10b encoding, Display Stream Compression (DSC) encoding, and the like. The descrambling engine 306 is configured to descramble the decoded video signals generated by the decoding engine 304. Techniques for descrambling are described in the DisplayPort specifications. The output of the descrambling engine 306 (and therefore the upstream video engine 120) is a video signal suitable for presentation by a video presentation device or suitable for further video processing. An H.264 stream is one non-limiting example of the output, though other suitable video formats may be used. In some embodiments, the output of the upstream video engine 120 may include audio information and/or AUX channel information as well.

In some embodiments, the illustrated components of the upstream video engine 120 may be combined with each other, or individual components may be split into multiple components. Some other example components suitable for use in the upstream video engine 120 are described in the descriptions in the DisplayPort specifications of components for providing a main link.

Figure 4:
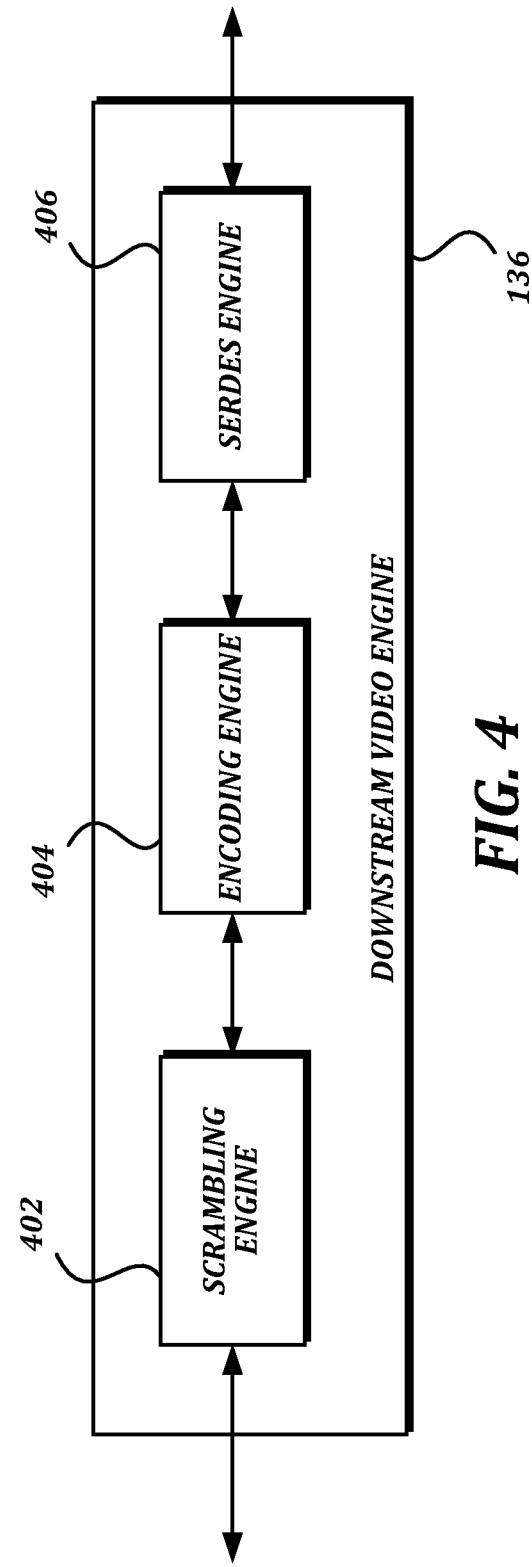
FIG. 4 is a block diagram that illustrates an exemplary embodiment of a downstream video engine according to various aspects of the present disclosure.

FIG. 4 is a block diagram that illustrates an exemplary embodiment of a downstream video engine according to various aspects of the present disclosure. In some embodiments, the downstream video engine 136 provides the inverse of the functionality of the upstream video engine 136. That is, the downstream video engine 136 may video and audio signals suitable for presentation, and transmits DisplayPort data. As illustrated, the downstream video engine 136 includes a scrambling engine 402, an encoding engine 404, and a SERDES engine 406. The scrambling engine 402 receives the video and/or audio signals and scrambles them using any suitable technique, including but not limited to the techniques described in the DisplayPort specification. The encoding engine 404 receives the scrambled video and/or audio signals from the scrambling engine 402 and encodes them using any suitable technique, including but not limited to 8b/10b encoding, DSC encoding, and/or the like. The SERDES engine 406 then joins multiple scrambled and encoded data streams into a single serialized signal for transmission. As with the components of the upstream video engine 120, the components of the downstream video engine 136 may be combined or split apart, and both the functionality and the structure are similar to the main link described in the DisplayPort specifications.

Figure 5:
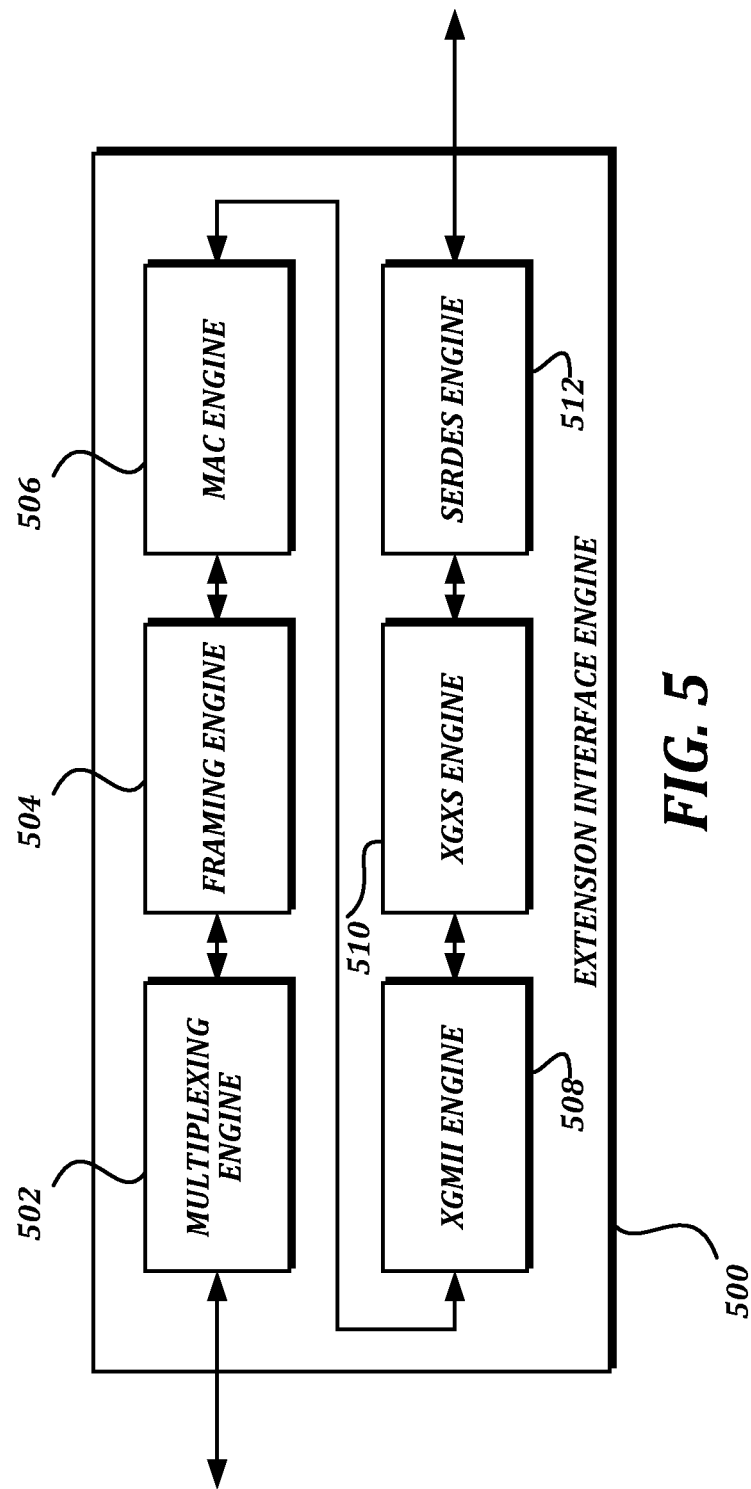
FIG. 5 is a block diagram that illustrates an exemplary embodiment of an extension interface engine according to various aspects of the present disclosure.

FIG. 5 is a block diagram that illustrates an exemplary embodiment of an extension interface engine according to various aspects of the present disclosure. A primary purpose of the extension interface engine 500, when on the UFP device 104, is to transmit the video, audio, and/or AUX signals over the extension medium 90 in an extension format. When on the DFP device 106, a primary purpose of the extension interface engine 500 is to receive extension format information from the extension medium 90 and converts it back into the original video, audio, and/or AUX signals. The extension interface engine 500 may also communicate information bi-directionally, and may be used for conducting a connection handshake between the UFP device 104 and the DFP device 106.

As illustrated, the extension interface engine 500 includes a multiplexing engine 502, a framing engine 504, a media access control (MAC) engine 506, a 10-gigabit media-independent interface (XGMII) engine 508, an XGMII extender sublayer (XGXS) engine 510, and a SERDES engine 512. Obtaining, implementing, and/or integrating each of these components with each other to form the extension interface engine 500 is within the knowledge of one of ordinary skill in the art, and so is not described in detail. The extension interface engine 500 as illustrated is configured to use gigabit Ethernet as the extension medium 90. In some embodiments, a different extension medium 90 may be used, and so the components of the extension interface engine 500 would be selected as appropriate for use with the different extension medium.

Figure 6A:
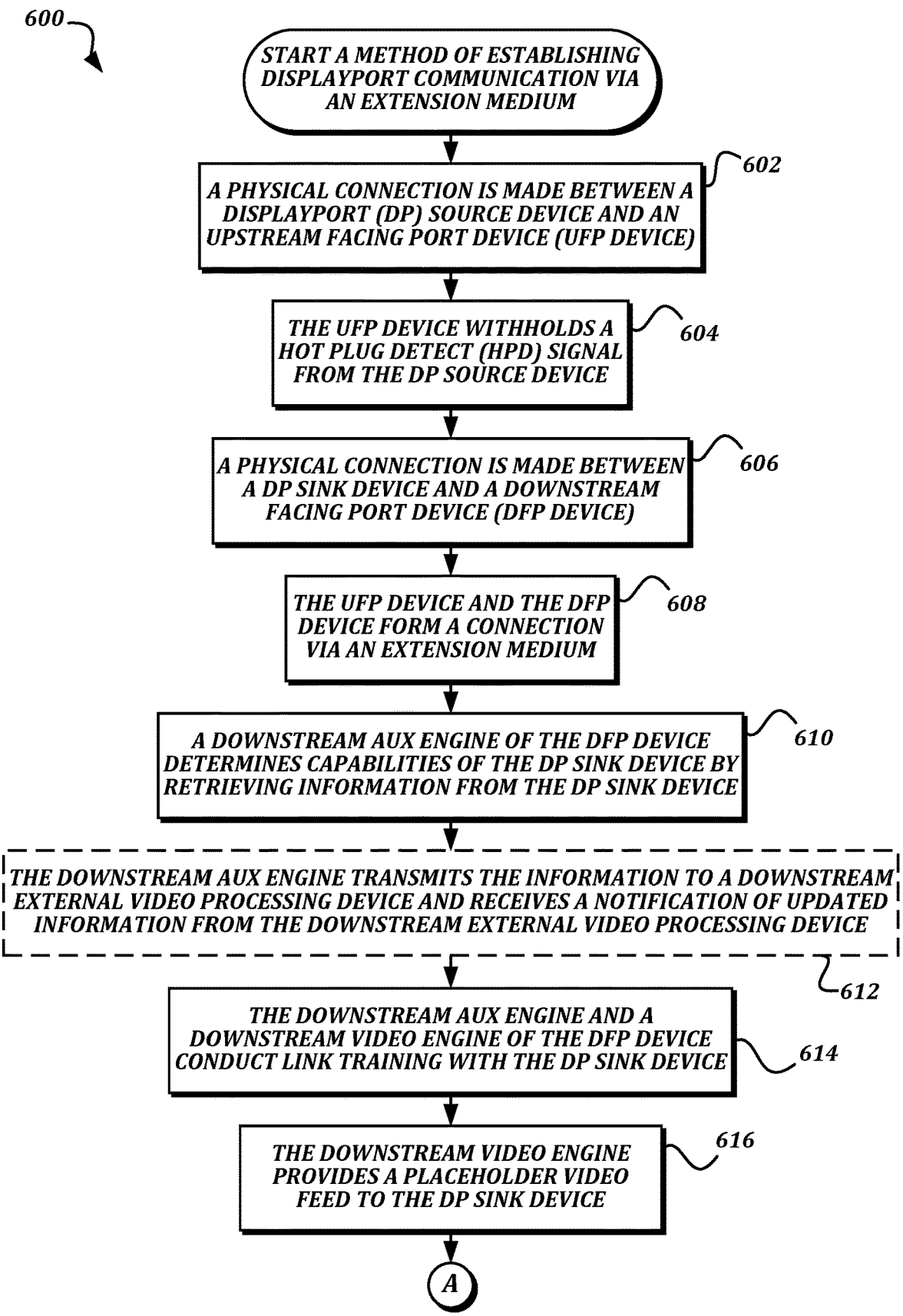
FIGS. 6A-6B are a flowchart that illustrates an exemplary embodiment of a method of establishing DisplayPort communication between a source device and a sink device via an extension medium according to various aspects of the present disclosure.
Figure 6B:
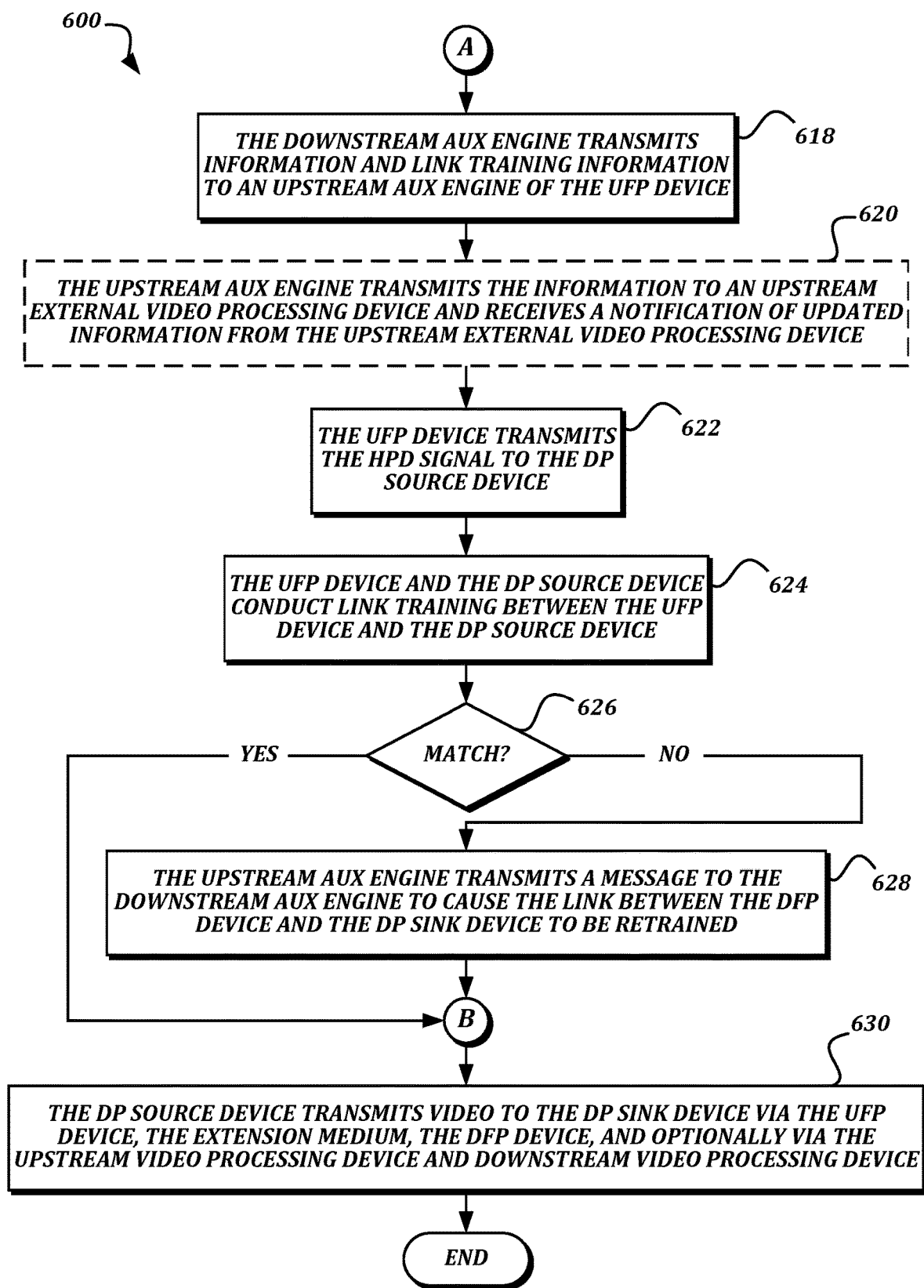

FIGS. 6A-6B are a flowchart that illustrates an exemplary embodiment of a method of establishing DisplayPort communication between a source device and a sink device via an extension medium according to various aspects of the present disclosure. From a start block, the method 600 proceeds to block 602, where a physical connection is made between a DisplayPort (DP) source device 102 and an upstream facing port device (UFP device) 104. The physical connection between the DisplayPort source device 102 and the UFP device 104 may be substantially as described in the DisplayPort specifications. At block 604, the UFP device 104 withholds a hot plug detect (HPD) signal from the DP source device 102. This behavior contradicts the behavior expected under the DisplayPort specifications. Normally, the HPD signal would be presented by a DisplayPort sink upon connection to a DisplayPort source. However, technical problems are created by the introduction of the extension medium 90, in that the UFP device 104 may be connected to the DisplayPort source device 102 before a handshake has been performed between the UFP device 104 and the DFP device 106, and before capabilities of the DisplayPort sink device 108 are known to the UFP device 104. This could cause the DisplayPort source device 102 to try (and fail) to train the DisplayPort link with the UFP device 104. Withholding the HPD signal keeps the DisplayPort source device 102 from realizing that anything is connected, and so prevents the DisplayPort source device 102 from trying to train a DisplayPort link until the UFP device 104 is ready to do so.

At block 606, a physical connection is made between a DisplayPort sink device 108 and a downstream facing port device (DFP device) 106. Similar to above-described connection, the physical connection between the DisplayPort sink device 108 and the DFP device 106 substantially complies with the DisplayPort specifications. The DisplayPort sink device 108 may begin presenting an HPD signal to the DFP device 106 at this point, but the DFP device 106 ignores the signal until it is ready.

At block 608, the UFP device 104 and the DFP device 106 form a connection via an extension medium 90. The connection may be formed using any suitable technique. As one example, the UFP device 104 and the DFP device 106 may exchange a presence notification and an acknowledgement. As another example, forming the connection may include configuring the UFP device 104 and the DFP device 106 with a unique identifier of the opposite device, such as an IP address, a MAC address, and/or the like, in order to facilitate communication between the intended devices if the extension medium 90 is a network on which multiple devices may be present (as opposed to a point-to-point connection). Forming the connection between the UFP device 104 and the DFP device 106 may include exchanging capabilities of the devices and determining what features will be available. The connection formed in block 608 may happen either before or after the actions described in blocks 602-606.

The method 600 then proceeds to block 610, where a downstream AUX engine 138 of the DFP device 106 determines capabilities of the DisplayPort sink device 108 by retrieving information from the DisplayPort sink device 108. The information describes the capabilities of the DisplayPort sink device 108, and may be any suitable type of information including but not limited to DisplayPort Configuration data (DPCD), extended display identification data (EDID), and Monitor Control Command Set (MCCS) data. The information is obtained from the DisplayPort sink device 108 using a standard protocol. The information may include information about the supported capabilities of the DisplayPort sink device 108, such as (but not limited to) screen resolutions, bit depths, frame rates, numbers of DisplayPort lanes, and/or the like.

At optional block 612, the downstream AUX engine 138 transmits the information to a downstream external video processing device 134 and receives a notification of updated information from the downstream external video processing device 134. The information is provided to the downstream external video processing device 134 in order to allow the downstream external video processing device 134 to affect the capabilities eventually presented to the DisplayPort source device 102 in order to account for the functionality of the downstream external video processing device 134. As one example, the downstream external video processing device 134 could alter the information to indicate support for higher resolutions than those supported by the DisplayPort sink device 108 so that higher quality video is transmitted by the host. The downstream external video processing device 134 could then downsample the video, extract a region of interest, or otherwise provide video that the DisplayPort sink device 108 could handle. As another example, the downstream external video processing device 134 could change the information to indicate support for lower resolutions only, in order to manage bandwidth on the extension medium 90. The actions of block 612 are described as optional because the downstream external video processing device 134 may not be present, or may not alter the information (though it may nevertheless store the information received from the DFP device 106.

Next, at block 614, the downstream AUX engine 138 and a downstream video engine 136 of the DFP device 106 conduct link training with the DP sink device 108. At this point, the DFP device is essentially masquerading as or emulating a DisplayPort source in order to configure the DisplayPort sink device 108 and determine the capabilities of the link between the DFP device 106 and the DisplayPort sink device 108. In some embodiments, this link training is performed before any video information is transmitted between the DFP device 108 and the UFP device 106. Exemplary processes for link training are described in the DisplayPort specifications.

At block 616, the downstream video engine 136 provides a placeholder video feed to the DisplayPort sink device 108. The placeholder video feed maintains the trained link between the DFP device 106 and the DisplayPort sink device 108, even in the absence of video information from the DisplayPort source device 102. The placeholder video feed may include a blank video or all-black video; a static splash screen or screen saver; or any other suitable video and/or audio signal generated by the DFP device 106. The method 600 then proceeds to a continuation terminal ("terminal A").

From terminal A (FIG. 6B), the method 600 proceeds to block 618, where the downstream AUX engine 138 transmits information and link training information to an upstream AUX engine 122 of the UFP device 104. The link training information indicates the configuration of the trained link between the DFP device 106 and the DisplayPort sink device 108. The information may be the information received from the DisplayPort sink device 108, the information as altered by the downstream external video processing device 134, or both. The downstream AUX engine 138 may transmit the information to the upstream AUX engine 122 over the extension medium 90 via any suitable protocol and/or technique.

At optional block 620, the upstream AUX engine 122 transmits the information and link training information to an upstream external video processing device 118 and receives a notification of updated information from the upstream external video processing device 118. Similar to the description above relating to the downstream external video processing device 134, the upstream external video processing device 118 may raise or lower bandwidth or resolution capabilities to enable the video processing functionality provided by the upstream external video processing device 118. The actions of block 620 are described as optional because the upstream external video processing device 118 may not be present and/or because the upstream external video processing device 118 may not make any changes to the information.

At block 622, the UFP device 104 transmits the HPD signal to the DP source device 102. The DisplayPort source device 102 can then detect the connection of the UFP device 104, and begins trying to establish a DisplayPort connection. Accordingly, at block 624, the UFP device 104 and the DisplayPort source device 102 conduct link training between the UFP device 104 and the DisplayPort source device 102. The UFP device 104 trains the link using capabilities based on the information either received from the DFP device 106 or from the upstream external video processing device 118. The UFP device 104 may use the received information as maximum or minimum supported capabilities. In some embodiments, the aim may be to train the link between the DisplayPort source device 102 and the UFP device 104 to have the same characteristics as the link trained between the DFP device 106 and the DisplayPort sink device 108. In some embodiments, the aim may be to train the link between the DisplayPort source device 102 and the UFP device 104 such that the DisplayPort source device 102 outputs a video stream having characteristics requested by the upstream external video processing device 118 or the downstream external video processing device 134.

The method 600 then proceeds to a decision block 626, where a test is performed to determine whether the link trained between the DisplayPort source device 102 and the UFP device 104 has capabilities that match the link trained between the DFP device 106 and the DisplayPort sink device 108. In some embodiments, matching may include links that have identical capabilities. In some embodiments, matching may include the link between the DisplayPort source device 102 and the UFP device 104 carrying at least enough information to saturate the link between the DFP device 106 and the DisplayPort sink device 108, with the exact up conversion or down conversion to the characteristics supported by the link to the DisplayPort sink device 108 performed by the upstream video engine 120, the downstream video engine 136, the upstream external video processing device 118, or the downstream external video processing device 134.

If the result of the test at decision block 626 is YES, then the method 600 proceeds to a continuation terminal ("terminal B"). Otherwise, if the result of the test at decision block 626 is NO, then the method 600 proceeds to block 628, where the upstream AUX engine 122 transmits a message to the downstream AUX engine 138 to cause the link between the DFP device 106 and the DisplayPort sink device 108 to be retrained. This may be performed, for example, in cases where the link between the DFP device 106 and the DisplayPort sink device 108 expects a greater amount of information than can be transmitted by the DisplayPort source device 102, cases where the DisplayPort source device 102 has been configured to operate in an alternate mode, and/or any other situation in which the link between the DFP device 106 and the DisplayPort sink device 108 does not match the link needed to support the video and/or audio data to be supplied to the DisplayPort sink device. In some embodiments, the DFP device 106 will match its capabilities to support the upstream trained link in cases wherein the link is to be retrained.

The method 600 then proceeds to terminal B, and then to block 630, where the DP source device 102 transmits video to the DP sink device 108 via the UFP device 104, the extension medium 90, the DFP device 106, and optionally via the upstream external video processing device 118 and the downstream external video processing device 134. As described above, in some embodiments the extension interfaces 116, 126 may exchange the video and/or audio information directly and may optionally provide it to the upstream and downstream external video processing devices 118, 134. Also, in some embodiments, the upstream and downstream external video processing devices 118, 134 may directly exchange the video and/or audio information via the extension medium 90. The method 600 then proceeds to an end block and terminates.

As described above, the method 600 assumes that the connection to the DisplayPort source device 102 is trained based on the capabilities of the DisplayPort sink device 108 (as optionally modified by the external video processing devices 118, 134). However, in some embodiments, the connection between the DisplayPort source device 102 and the UFP device 104 may be trained first, and the connection between the DFP device 106 and the DisplayPort sink device 108 may subsequently be trained based on the capabilities of the trained link between the DisplayPort source device 102 and the UFP device 104 (as optionally modified by the external video processing devices 118, 134). In such an embodiment, the UFP device 104 would not withhold the HPD signal from the DisplayPort source device 102 as stated in block 604, and instead the UFP device 104 would present the HPD signal in order to start training the link to the DisplayPort sink device 108 based on its own capabilities. Further, in such an embodiment, the DFP device 106 may not provide a placeholder video feed to the DisplayPort sink device 108 as described in block 616, but would instead not start link training with the DisplayPort sink device 108 until the information regarding the capabilities of the host (or modified information) is received by the DFP device 106 from the UFP device 104, which may render the placeholder video feed unnecessary.

In some embodiments, the UFP device 104 may train the link with the DisplayPort source device 102 while the DFP device 106 is training the link with the DisplayPort sink device 108, and capabilities will be exchanged between the UFP device 104 and the DFP device 106 (and one of the links may be re-trained to match) thereafter. In such embodiments, the UFP device 104 and the DFP device 106 may not be connected to each other during this initial link training.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for processing DisplayPort communication transmitted between a DisplayPort source device and a DisplayPort sink device over an extension medium, the system comprising:
an upstream facing port device (UFP device) communicatively coupled to the DisplayPort source device; and
a downstream facing port device (DFP device) communicatively coupled to the UFP device via the extension medium and communicatively coupled to the DisplayPort sink device;
an upstream external video processing device coupled to an interface of the UFP device; and
a downstream external video processing device coupled to an interface of the DFP device;
wherein the UFP device is configured to:
receive DisplayPort information from the DisplayPort source device;
extract at least one of video information and audio information from the DisplayPort information;
transmit the at least one of video information and audio information for processing by the external video processing device;
receive, via the interface of the UFP device, at least one of processed video information and processed audio information from the upstream external video processing device; and
transmit, via the extension medium, the at least one of processed video information and processed audio information to the DFP device or to the downstream external video processing device.

2. The system of claim 1, wherein transmitting the at least one of processed video information and processed audio information to the DFP device or to the downstream external video processing device includes transmitting the at least one of processed video information and processed audio information to the downstream external video processing device via the extension medium; and
wherein the DFP device is configured to:
receive, via the interface of the DFP device, at least one of de-processed video information and de-processed audio information from the downstream external video processing device; and
transmit, to the DisplayPort sink device, DisplayPort information including the at least one of de-processed video information and de-processed audio information.

3. The system of claim 1, wherein transmitting the at least one of processed video information and processed audio information to the DFP device or to the downstream external video processing device includes transmitting the at least one of processed video information and processed audio information to the DFP device via the extension medium; and
wherein the DFP device is configured to:
receive the at least one of processed video information and processed audio information via the extension medium; and
transmit, via the interface of the DFP device, the at least one of processed video information and processed audio information to the external video processing device.

4. The system of claim 3, wherein the DFP device is further configured to:
receive, via the interface of the DFP device, at least one of de-processed video information and de-processed audio information from the downstream external video processing device; and
transmit, to the DisplayPort sink device, DisplayPort information including the at least one of de-processed video information and de-processed audio information.

5. The system of claim 1, wherein extracting at least one of video information and audio information from the DisplayPort information includes decoding and descrambling encoded, scrambled video from one or more DisplayPort lanes.

6. A downstream facing port device (DFP device), comprising:
- an extension interface configured to be coupled to an extension medium;
- a DisplayPort interface configured to be coupled to a DisplayPort sink device; and
- an external video processing device interface configured to be coupled to an external video processing device;
- wherein the DFP device is configured to:
  - receive, via the external video processing device interface, at least one of de-processed video information and de-processed audio information from an external video processing device, wherein the external video processing device received at least one of processed video information and processed audio information via the extension medium; and
  - transmit, via the DisplayPort interface, DisplayPort information including the at least one of de-processed video information and de-processed audio information.

7. The DFP device of claim 6, wherein the DFP device is further configured to encode and scramble the de-processed video information for generating one or more DisplayPort lanes.

8. A downstream facing port device (DFP device), comprising:
- an extension interface configured to be coupled to an extension medium;
- a DisplayPort interface configured to be coupled to a DisplayPort sink device; and
- an external video processing device interface configured to be coupled to an external video processing device;
- wherein the DFP device is configured to:
  - receive, via the extension medium, at least one of processed video information and processed audio information;
  - transmit, via the external video processing device interface, the at least one of processed video information and processed audio information for processing by an external video processing device;
  - receive, via the external video processing device interface, at least one of de-processed video information and de-processed audio information from the external video processing device; and
  - transmit, via the DisplayPort interface, DisplayPort information including the at least one of de-processed video information and de-processed audio information.

9. The DPF device of claim 8, wherein the DFP device is further configured to encode and scramble the de-processed video information for generating one or more DisplayPort lanes.

* * * * *